Aug. 23, 1960    K. O. SISSON    2,949,759
DOMESTIC APPLIANCE
Filed June 27, 1957    2 Sheets-Sheet 1

| Switches Closed | TIME IN MINUTES | | | | | | | |
|---|---|---|---|---|---|---|---|---|
| | 0 | 6 | 12 | 18 | 24 | 30 | 36 | 42 |
| 51 | | | ▨ | ▨▨▨ | | | | |
| 52 | | | | ▨ | ▨▨ | | | |
| 53 | | | ▨▨ | | ▨▨ | | | |
| 54 | ▨▨▨▨▨▨▨ | | | | | | | ▨ |
| 55 | | | ▨▨▨▨▨▨▨▨▨▨▨▨▨▨ | | | | | |
| 56 | ▨▨▨▨▨▨▨ | | ▨▨ | | | | | ▨ |
| 57 | | ▨▨▨▨▨ | | | ▨▨▨ | | | |
| 58 | ▨▨ | | | | | | | ▨ |

INVENTOR.
Kenneth O. Sisson
BY Edwin S. Dybvig
His Attorney

United States Patent Office 2,949,759
Patented Aug. 23, 1960

2,949,759
DOMESTIC APPLIANCE

Kenneth O. Sisson, Dayton, Ohio, assignor to General Motors Corporation, Detroit, Mich., a corporation of Delaware Filed June 27, 1957, Ser. No. 668,485

1 Claim. (Cl. 68—12)

This invention relates to a domestic appliance and more particularly to a washing machine that is provided with a water temperature control system for controlling the temperature of water being supplied to the tub of the machine.

An object of the invention is to provide a washing machine with solenoid operated valve apparatus that operates to control the temperature of water being supplied to the tub of the machine, the control circuit for the solenoid valve apparatus including a wash selector switch and a rinse selector switch both connected with a voltage supply and with the solenoid valve apparatus for controlling the temperature of both the wash water and the rinse water that is supplied to the tub of the machine, and wherein the wash selector switch and rinse selector switch may be pre-set prior to a washing operation.

Another object of this invention is to provide a water temperature control system for a washing machine which includes a plurality of solenoid operated valves that control the passage of water between a plurality of water inlet pipes and the tub of the machine, the system including a wash selector switch for controlling the solenoid valves and a rinse selector switch for controlling the solenoid valves, there being a timer operated switch mechanism for alternately directly connecting the solenoids of the valves in a circuit with the rinse selector switch or wash selector switch without the use of relays or other similar auxiliary circuit apparatus.

Still another object of this invention is to provide a water temperature control system for a washing machine including two solenoid operated valves for controlling the flow of water between hot and cold water inlet pipes and the tub of the machine, the solenoid operators for the valves being controlled by a wash selector switch having a closed and an open position, and by a rinse selector switch having a closed and an open position, the wash selector switch and the rinse selector switch being placed alternately in sole control of the solenoid operators by a timer operated switch mechanism.

Further objects and advantages of the present invention will be apparent from the following description, reference being had to the accompanying drawings, wherein a preferred form of the present invention is clearly shown.

Figures 1, 3:
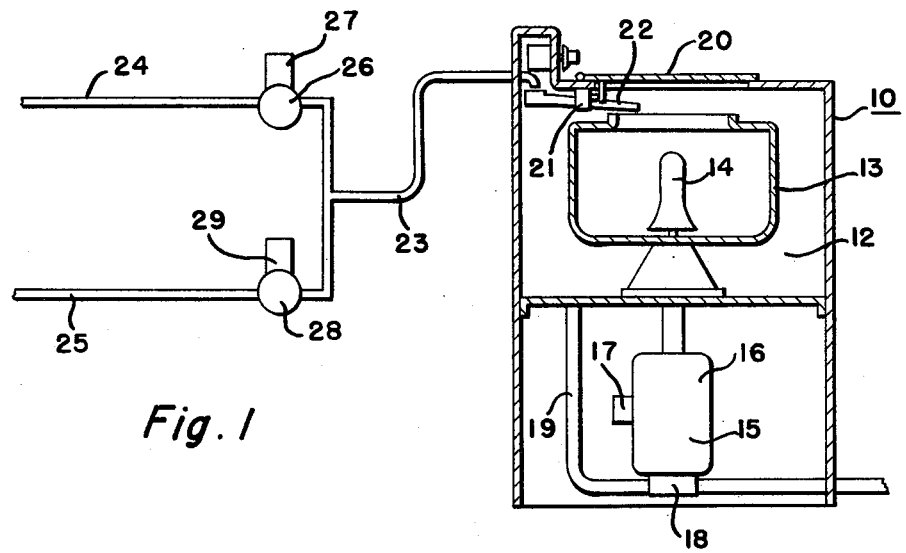
Figure 1 is a diagrammatic illustration of the washing machine of this invention showing the water supply apparatus for the washing machine.
Figure 3 is a sequence chart showing the times at which the timer operated switches in Figure 2 are closed.

Referring now to the drawings and more particularly to Fig. 1, a washing machine generally designated by reference numeral 10 has an outer tub 12 and an inner tub 13. A vertically reciprocable agitator 14 is disposed within the tub 13 and is driven by an electric motor 15 through a transmission 16. A spin solenoid 17 controls the transmission so as to provide for either vertical reciprocation of agitator 14 or high speed rotation of tub 13. When the electric motor 15 is energized the agitator 14 is vertically reciprocated, whereas when the motor 15 and spin solenoid 17 are both energized, the tub 13 is rotated at high speed for spinning water out of the inner tub 13 into the outer tub 12. The transmission mechanism and spin solenoid may be of the type shown in the patent to Kendall Clark, 2,422,395, dated June 17, 1947. The outer tub 12 is exhausted of water by a pump 18 that is driven by electric motor 15 and which is connected to the tub 12 by a pipe 19. The top of the washing machine has an access opening that is closed by a door 20 which is pivoted to the outer cabinet of the machine. The door actuates a normally open door switch 21 to its closed position when the door is in a closed position.

The water filling apparatus for the washing machine includes a spout 22 having an outlet located over the top opening of inner tub 13. This spout is fed by a pipe 23 which is connected through solenoid valve apparatus to a hot water pipe 24 and a cold water pipe 25. The pipes 23, 24 and 25 and the solenoid valve apparatus are preferably located within the washing machine but are shown exteriorly thereof for clarity of explanation. The hot water pipe 24 and the cold water pipe 25 are connected with suitable hot and cold water supply means. The flow of hot water between pipe 24 and pipe 23 is controlled by a solenoid operated valve 26 having a solenoid operator 27. The flow of cold water between pipe 25 and pipe 23 is controlled by a solenoid valve 28 having a solenoid operator 29. It can be seen that energization of solenoids 27 and 29 will provide a mixture of hot and cold water to pipe 23, which is at a "warm" temperature. The energization of solenoid 27 will provide only hot water for the machine, while the energization of solenoid 29 provides only cold water to the machine.

Figure 2:
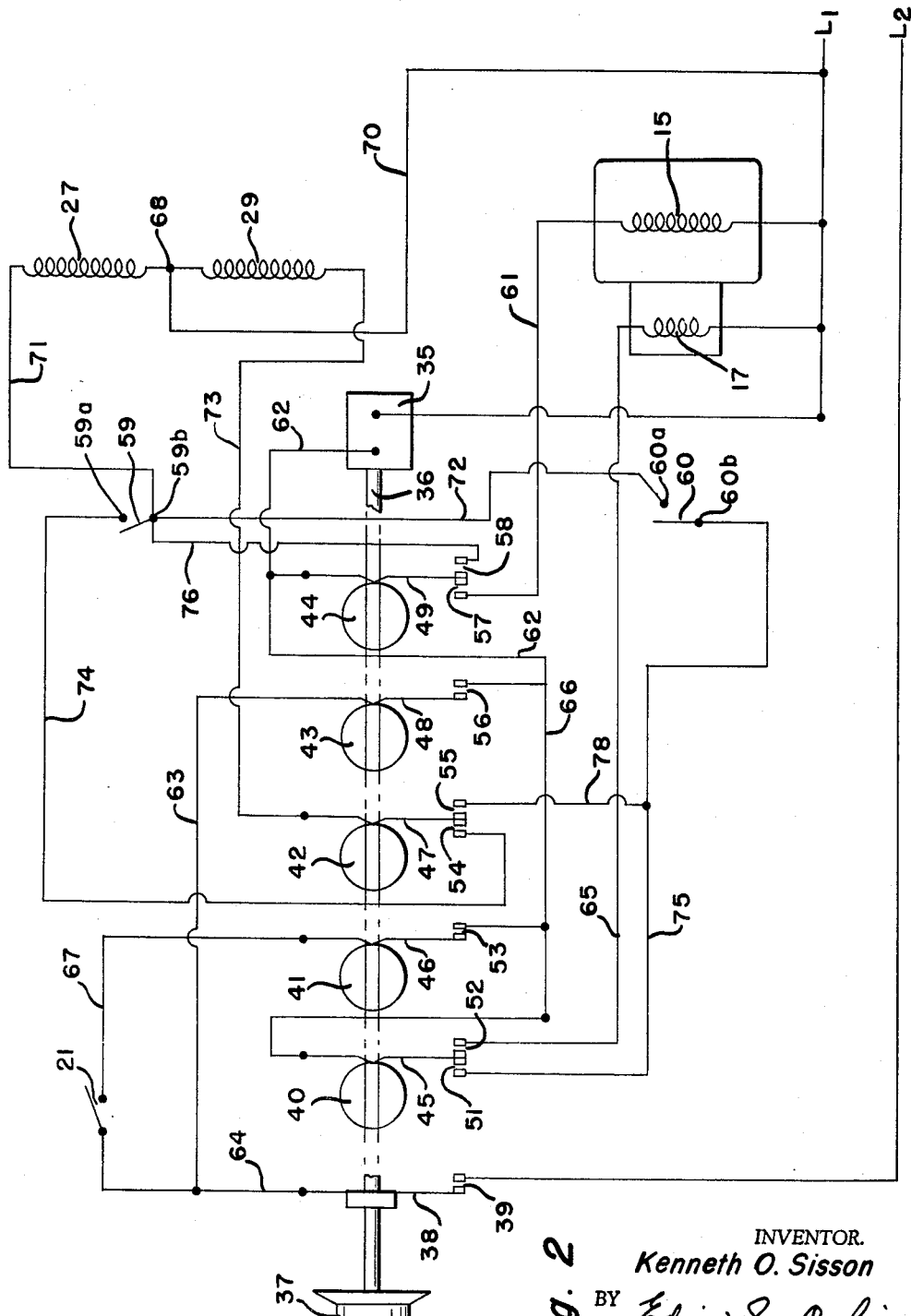
Figure 2 is an electric circuit diagram of the control circuit of the washing machine of this invention.

Referring now to Fig. 2, a circuit diagram of the control circuit of the washing machine is shown. The various operations of the washing machine are controlled by a sequential controller or timer which includes an electric timer motor 35 that rotatably drives a shaft 36. The shaft 36 is connected with a control knob 37 which rotates with shaft 36. The control knob 37 and shaft 36 may also move axially to move an electric contactor 38 which cooperates with an electric contact to form a switch 39. When the shaft 36 is pushed in so as to move it rightwardly in Fig. 2, the switch 39 is closed.

The shaft 36 carries a plurality of cams designated, respectively, by reference numerals 40, 41, 42, 43 and 44. These cams respectively operate electrical conducting connectors 45, 46, 47, 48 and 49. The contact 45 is associated with two electrical contacts to form electrical switches 51 and 52. In a like manner contacts 46, 47, 48 and 49 cooperate with associated electric contacts to form switches 53, 54, 55, 56, 57 and 58. The cams 40, 41, 42, 43 and 44 during rotation of shaft 36 are designed to close the switches 51, 52, 53, 54, 55, 56, 57 and 58 during certain intervals of time, as indicated by the chart in Fig. 3, which shows the times at which each of the last-mentioned switches is closed. Thus, as timer 35 rotates shaft 36 the cams close the timer operated switches for predetermined intervals of time, as indicated by the chart in Fig. 3.

The control circuit of Fig. 2 includes a wash selector switch designated by reference numeral 59, having fixed contacts 59a and 59b and which has an open and a closed position for controlling the energization of solenoids 27 and 29. A similar rinse selector switch 60 having fixed contacts 60a and 60b has an open and a closed position and controls the energization of solenoids 27 and 29 during the time that rinse water is being supplied to the tub of the washing machine.

The electric motor 15 has one side connected directly to power input line $L_1$ and has its other side connected with timer operated switch 57 via line 61. The other power input line is designated by reference numeral $L_2$ and the two power lines are connected with a suitable source of voltage. The movable contactor 49 is connected with a line 62 that is in turn connected with one side of switch 56. The opposite side of switch 39 is connected directly with power input line $L_2$.

The spin solenoid 17 has one side directly connected to line $L_1$ and has its other side connected to one side of switch 52 via line 65. The opposite side of switch 52 is connected with a line 66 that is in turn connected with one side of switches 53 and 56. The opposite side of switch 53 is connected in series with lid operated switch 21 via a line 67. From an inspection of Figs. 2 and 3 it can be seen that motor 15 is energized when switches 57, 56 and 39 are closed. These switches are closed during the agitation cycle of the washing machine to vertically reciprocate agitator 14. During the spin cycle of the washing machine when the tub 13 is spun at high speed, the motor 15 is energized through switches 57, 53 and through lid switch 21. It thus can be seen that an opening of the lid switch 21, which may be accomplished by opening door 20, will operate to open the circuit to both motor 15 and spin solenoid 17 to terminate spinning of the tub. The lid switch 21, when in an open position, will not terminate the vertical reciprocation of agitator 14 during the agitation cycle of the washing machine, due to the fact that a circuit is connected to the motor at this time via timer operated switches 56 and 57. It thus is apparent that the lid switch only operates to terminate operation of the motor 15 during the high speed spin period of tub 13 when the timer switches 52 and 53 are closed.

The solenoids 27 and 29 that operate valves 26 and 28 are connected together at a common tie-point designated by reference numeral 68. This common tie-point is connected directly to input power line $L_1$ via line 70. The opposite side of solenoid 27 is connected directly to one side of switch 59 via line 71 and is connected directly to one side of switch 60 at 60a via lines 71 and 72. The opposite side of solenoid 29 is connected directly to the movable contactor 47 via line 73. The fixed contact 59a of switch 59 is connected directly to one side of switch 54 via line 74, while the fixed contact 60b of switch 60 is connected directly to one side of switches 51 and 55 via line 75.

The user of the washing machine desiring to set the machine into operation rotates the knob 37 to a "start" or "wash-fill" position and axially moves control shaft 36 to close switch 39. At this time the timer motor 35 is energized through timer operated switch 56 and switch 39. In this position the switches 54, 56 and 58 are closed, as indicated by the sequence chart of Fig. 3. Assuming that the wash selector switch 59 is in the open position as shown in Fig. 2, the solenoid 27 will be energized thereby providing the washing machine tub with water at a hot temperature due to the connection of hot water pipe 24 and pipe 23. The solenoid 27 in this position of the timer and selector switch 59 is energized via line 71, line 76, switch 58, line 62, switch 56, line 63, line 64, and through switch 39 back to power input line $L_2$. If the selector switch 59 were in a closed position both solenoids 27 and 29 would be energized to provide a mixture of hot and cold water at a "warm" temperature, to the machine. With such a setting the solenoid 27 is energized via line 71, line 76, switch 58, line 62, switch 56, lines 63 and 64, and through switch 39 back to line $L_2$. The solenoid 29 would then be energized via line 73, switch 54, line 74, through selector switch 59, line 76, switch 58, line 62, switch 56, lines 63 and 64 and back to line $L_2$ through switch 39. The tub continues to fill with water as long as timer operated switches 54, 56 and 58 are closed and the wash-fill cycle of the washing machine ends when switch 58 opens.

When timer operated switch 58 opens, timer operated switch 57 closes to energize the electric motor 15 thereby vertically reciprocating agitator 14. This vertical reciprocation of agitator 14 agitates the clothes within tub 13 during the agitation cycle of the washing machine. Following the agitation cycle of the washing machine switches 52 and 53 are closed and switch 56 opens to provide an energizing circuit for spin solenoid 17 through the lid switch 21. At this point in the cycle, the tub 13 is rotated at high speed to centrifuge the water into the outer tub 12. The spin cycle continues until switch 52 opens whereupon switch 56 once more closes.

Immediately following the high speed spin cycle the washing machine 13 is filled with rinse water, as is evident from an inspection of the chart of Fig. 3. Assuming that the rinse selector switch 60 is in the open position, shown in Fig. 2, a circuit is completed for solenoid 29 to provide a rinse water at a cold temperature due to the fact that the cold water pipe 25 and pipes 23 are connected through valve 28. The solenoid 29 is energized via line 73, switch 55, line 78, line 75, switch 51, line 66, switch 56, lines 63 and 64, and through switch 39 to line $L_2$. If the switch 60 were in a closed position, warm water would be supplied to tub 13 by the mixing of hot and cold water from pipes 24 and 25. In this case, both solenoids 27 and 29 are energized. The circuit for solenoid 27 may be traced via line 71, line 72, switch 60, line 75, switch 51, line 66, switch 56, lines 63 and 64 and through switch 39 to line $L_2$. The circuit for solenoid 29 may be traced via line 73, switch 55, switch 51, switch 56, lines 63 and 64 and through switch 39 to line $L_2$. It can be seen from the foregoing that the wash selector switch provides for either hot or warm wash water and that the rinse selector switch provides for either cold or warm rinse water.

It should be noted that each selector switch has exclusive control over solenoids 27 and 29, the switch 59 controlling the solenoids during the wash-fill cycle and the switch 60 controlling the solenoids during the rinse-fill cycle. Thus, during the wash-fill cycle, the timer operated switches 54 and 58 are connected with the wash selector switch 59 to provide for control of solenoids 27 and 29. During the rinse-fill cycle, however, the timer operated switches 51 and 55 are connected in circuit relationship with selector switch 60 to control solenoids 27 and 29. Thus, it can be seen that either switch 59 or switch 60 controls the solenoid exclusively of the other selector switch. It should also be noted that with selector switches 59 and 60 in their open positions, certain of the timer operated switches complete circuits directly to either solenoid 27 or 29.

At some point very near the end of the rinse-fill cycle when rinse water is being supplied to the washing machine, the switch 57 is closed as indicated from the chart of Fig. 3, to provide vertical reciprocation of agitator 14 during the supplying of rinse water to the tub. After the rinse cycle is complete, the switches 52 and 53 are closed to provide for high speed spinning of the tub, whereupon the rinse water is centrifugally thrown into outer tub 12 and is exhausted to drain. The cycle of the machine ends when the high speed spin cycle is completed and this occurs when switches 52 and 53 open for the second time, as shown in the chart of Fig. 3.

While the form of embodiment of the invention as herein disclosed constitutes a preferred form, it is to be understood that other forms might be adopted, as may come within the scope of the claim which follows.

What is claimed is as follows:

In combination, a washing machine having a tub, an agitator in said tub, a lid for selectively covering and uncovering said tub and prime mover means for selectively spinning said tub and vertically reciprocating said agitator, spin solenoid means connected to said prime mover means for conditioning said prime mover means for spinning said tub, a lid switch having an open position when said tub is uncovered by said lid and a closed position when said tub is covered by said lid, conduit means for directing water into said tub, a cold water inlet pipe, a hot water inlet pipe, a first solenoid operated valve including a first solenoid connected between said cold water pipe and said conduit means, a second solenoid operated valve including a second solenoid connected between said hot water inlet pipe and said conduit means, first and second power supply conductors, means connecting one side of said first and second solenoids directly to said first power supply conductor, a timer, first, second, third, fourth, fifth, sixth, seventh and eighth timer operated switches, said timer operating said second, fourth and sixth switches to a closed position during a wash water fill period, said timer operating said sixth and eighth timer operated switches to a closed position during an agitate period, said timer just prior to the end of said agitate period operating said first, third, sixth and eighth timer operated switches to a closed position for a cold water only tub overflow period, said timer operating said fifth, seventh, and eighth timer operated switches to a closed position for a spin period, said timer operating said first, third and sixth switches to a closed position for a rinse water fill period, means connecting the opposite side of said second solenoid in series with said fourth and sixth timer operated switches and said second power conductor to by-pass said lid switch whereby said second solenoid is energized when said fourth and sixth switches are closed, a wash selector switch having an open and a closed position, means connecting the opposite side of said first solenoid in series with said second timer operated switch, said wash selector switch, said fourth timer operated switch, said sixth timer operated switch and said second power conductor to by-pass said lid switch whereby said first solenoid is energized when said second, fourth and sixth timer switches and said wash selector switch are closed, means connecting said prime mover means in series with said first power supply conductor, said sixth timer operated switch, said eighth timer operated switch and said second power supply conductor to by-pass said lid switch whereby said prime mover means is energized to reciprocate said agitator during said agitate period, means connecting said opposite side of said first solenoid in series with said third, first and fifth timer operated switches and in series with said lid switch and said second power supply conductor prior to the start of said spin period whereby said first solenoid is energized for said cold water only overflow period and said washing machine is conditioned for said spin period, means connecting said spin solenoid means in series with said first power supply conductor, said seventh timer operated switch, said fifth timer operated switch, said lid switch and said second power supply conductor whereby the spinning of said tub is made responsive to the position of said lid switch, a rinse selector switch independent of said wash selector switch and having an open and a closed position, and means connecting said opposite side of said second solenoid in series with said rinse selector switch, said first timer operated switch, said sixth timer operated switch and said second power conductor to by-pass said lid switch whereby said second solenoid is energized when said rinse selector switch is closed and when said first and sixth timer operated switches are closed.

References Cited in the file of this patent
UNITED STATES PATENTS

| | | |
|---|---|---|
| 2,503,901 | Chace | Apr. 11, 1950 |
| 2,662,384 | Morrison et al. | Dec. 15, 1953 |
| 2,752,769 | Clark | July 3, 1956 |
| 2,795,126 | Sisson | June 11, 1957 |
| 2,841,003 | Conlee | July 1, 1958 |